Nov. 16, 1948.        R. M. CLAYPOOL ET AL        2,454,137
TUBING TOOL JOINT
Filed Oct. 10, 1947

Inventors:
R. M. CLAYPOOL
D. M. BEST
By Almon S. Nelson
Attorney

Patented Nov. 16, 1948

2,454,137

UNITED STATES PATENT OFFICE 2,454,137

TUBING TOOL JOINT

Robbins M. Claypool, Bellaire, and David M. Best, Houston, Tex.

Application October 10, 1947, Serial No. 779,102

3 Claims. (Cl. 285—146)

This invention relates to a tubing tool joint and the primary object of the invention is to provide a tool joint primarily for use with oil well or water well production tubing consisting of two members, one male, the other female, provided with a matching, fast tapered, coarse, shouldering thread, said thread form being such that sticking, cross threading and galling are eliminated, both on initial stabbing and screwing or makeup operations, and also on unscrewing or break-out operations.

A further object of the invention is to provide a tool joint of the aforementioned type comprising screw threads, the crests of which are substantially parallel with the axis of the joint.

Another object of the invention is to provide a tool joint of the aforementioned type having an inner diameter no smaller than that of the bore of the conventional tubing with which it is used, and an outer diameter no larger than the outer diameter of the conventional collar used on said tubing.

A further object of the invention is to provide a tool joint of the aforementioned type having a satisfactory safety factor in strength with respect to shearing or torque, tensile, and compressive stresses.

A further object of the invention is to provide a tool joint of the aforementioned type having adequate sealing qualities.

Another object of the invention is to provide a tool joint comprising continuous threads in which a material saving in time is effected in both make-up and break-out operations.

A further object of the invention is to provide a tool joint of the aforementioned type having high wear resisting qualities to enable it to be screwed and unscrewed many times without loss of efficiency in sealing or strength.

A further object of the invention is to provide a tool joint of the aforementioned type with male threads on bottom of lower member and female threads on top of upper member so that this joint can be applied or installed direct to the tubing without the necessity of removing coupling on upper end of lower tubing section.

Figure 1:
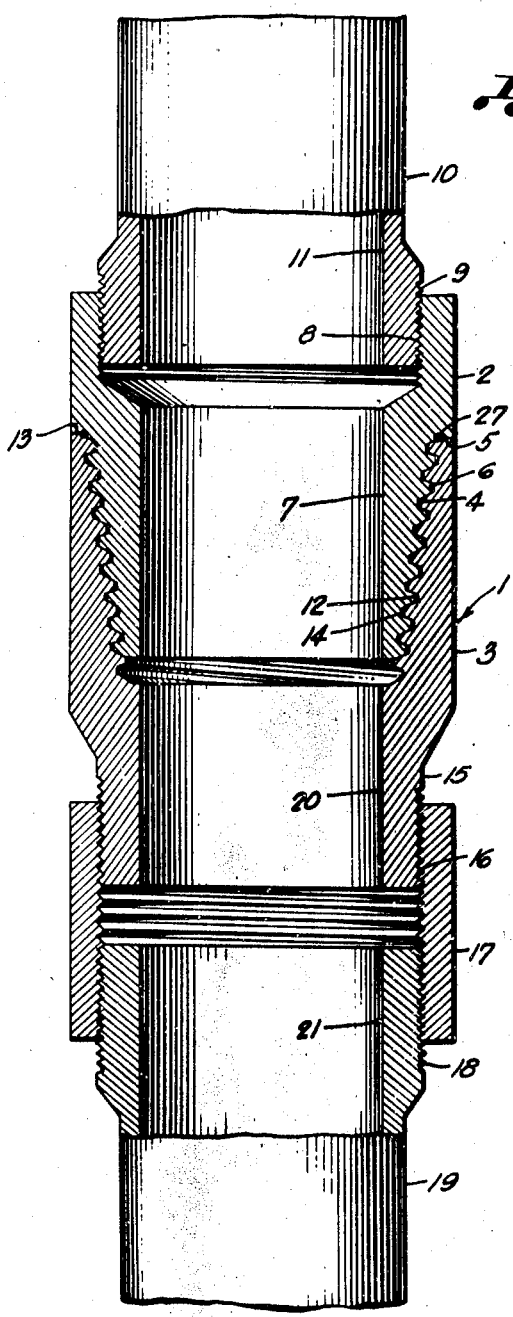
Figure 2:
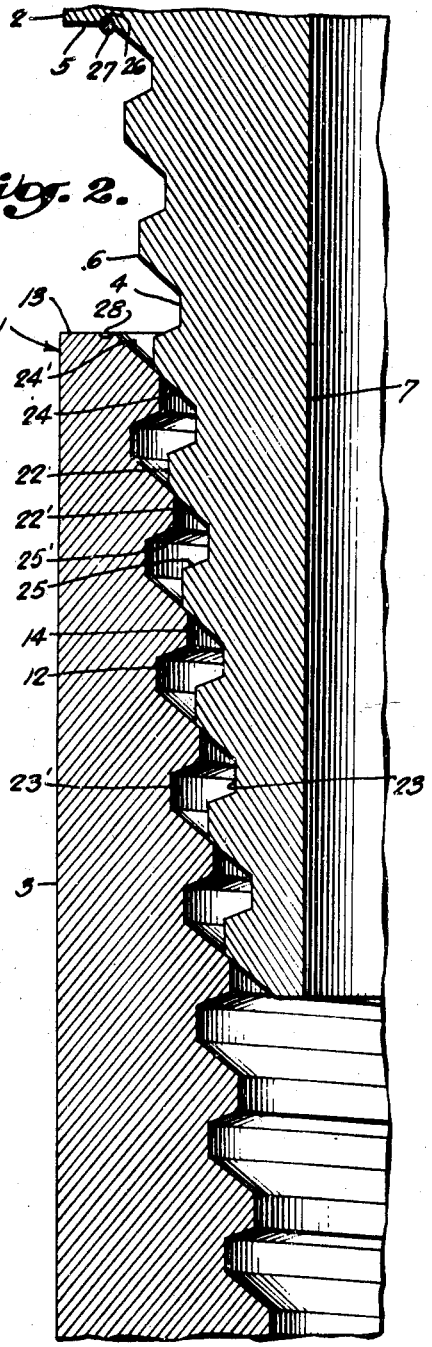

Other and further objects of the invention will become apparent as the description proceeds, reference being made to the accompanying drawings forming a part of the present disclosure, wherein:

Fig. 1 is a fragmentary sectional view, partly in elevation, of our tubing tool joint connected in a string of tubing; and Fig. 2 is an enlarged fragmentary, sectional view of our tubing tool joint, illustrating the form of the thread used, and the relative positions of the threads on the pin and box members at the end of the stabbing operation.

Referring in detail to the drawing, wherein for purposes of illustration one embodiment of our invention is shown, it will be seen that our tubing tool joint, generally indicated by reference numeral 1, comprises a male or pin member 2 and a female or box member 3.

The pin member 2 has a lower, external, downwardly and inwardly tapering surface 4, inwardly offset to provide an annular shoulder 5, and said surface 4 is provided with a screw thread 6. The upper end of the bore 7 of the member 2 is enlarged and threaded as indicated at 8 to receive the lower, externally threaded upset end 9 of an upper stand or pipe 10 of a production tubing string having a bore 11.

The box member 3 has an upper, internal, downwardly and inwardly tapering surface 12, inwardly offset to provide an annular end 13, and said surface 12 is provided with a screw thread 14 adapted to mate with the screw thread 6 of the pin member 2. The external diameter of the lower end 15 of the box member 3 is reduced and the said end is provided with external screw threads 16 adapted to be received within the conventional internally threaded collar 17 attached to the upper, externally threaded upset end 18 of a lower stand or pipe 19 of the production tubing string.

The box member 3 is provided with a bore 20, and the lower pipe 19 of the production tubing string has a bore 21, and, as illustrated the bores 11, 7, 20 and 21 have equal diameters. Also, as illustrated, the external diameters of the members 2 and 3 are equal to each other and to the external diameter of the collar 17.

Preferably, one of the tubing tool joints 1 is used between each stand of the tubing and, from the foregoing, it will be obvious that we have provided a tubing tool joint having an inner diameter no less than the inner diameter of the production tubing string, and an outer diameter no greater than the outer diameter of the conventional coupling used in the prodution tubing string. These dimensions are of the utmost importance since they permit all standard practices used with conventional tubing, such as coring, cutting, swabbing, washing over, and fishing operations to be performed with the same standard tubing tools such as slips, elevators, tongs, wrenches, overshots, and spears, in exactly the same manner as though our tubing tool joints were not in use. In addition, the volume of fluid passing through the production tubing string is not restricted.

Although other workers in the art have produced tubing tool joints, these have not been successful for the reason that the above prescribed limits as to inner and outer diameters were not and could not be adhered to for the reason that they could not design and produce a thread having the necessary requirements within the prescribed limits.

In the prior art tubing tool joints, when the tool joint pin is stabbed into the box, the crests of the pin threads most frequently land opposite the crests of the box threads, thus resulting in a jamming or wedging of the pin in the box. If the pin is then forcibly rotated in the make-up direction, damage to the crests of the threads occurs resulting in a seriously galled connection. Hence, the reason the prior art workers could not design a tubing tool joint within the prescribed limits as to inner and outer diameter, was because to observe the necessary safety factors in strength of the thread, which is dependent upon the cross-sectional area of the material, a slow taper was required, and in using standard formed threads with a slow taper the wedging effect and consequent galling was so serious that they had to increase the angle of taper and thus either increase the outer diameter of the joint or decrease the inner diameter thereof.

By our present invention, we have eliminated the wedging and consequent galling of the threads, by changing the thread form, instead of increasing taper angle and changing diameters, and thus we are able to produce a tubing tool joint within the prescribed limits as to outer diameter and inner diameter, the threads of said joint consisting of only from six to ten turns and meeting all requirements as to strength with respect to shearing or torque, tensile, and compressive stresses.

Referring to Fig. 2, wherein the threads 6 and 14 are illustrated most clearly, it will be seen that the crests 22, 22' of the said threads are flattened for an appreciable extent and extend substantially parallel with the axis of the tubing tool joint. It will also be seen that the threads 6 and 14 are trapeziform in cross-section, are relatively shallow, and of uniform height or depth from end to end thereof. As illustrated, the roots 23, 23' of the said threads are flat, and are also parallel to the axis of the tubing tool joint, but the latter is not necessary and the said roots may be inclined to the said axis if desired. The height or depth of the thread is considered to be the distance from the base of the thread to the crest thereof measured on a line perpendicular to the axis of the joint and passing through the centerline of the base of the thread.

The relatively steep taper of the surfaces 4 and 6 is made possible by the use of the threads just described, and hence our joint can be made within the prescribed limits as to inner and outer diameters.

The steep taper and the shallow threads combine to permit the pin member 2 to be deeply telescoped into the box member 3 in the stabbed position as illustrated in Fig. 2. This provides an initial engagement of the flank surfaces 24, 24' of the threads extending throughout more than 50% of the length of the threads 6 and 14 and at the end of the stabbing position, the said threads are automatically in mesh, whereby mating engagement of the threads is provided without interference from the crests thereof. Thus only three or four turns are required to fully make up the joint, and, since the threads are in mesh, the use of hand tongs for performing the meshing operation is eliminated, thereby resulting in an effective saving in time and labor in making up (and also breaking out) the joint.

As is clearly illustrated in Fig. 2, in the stabbed position the crests of the pin and box threads are not landed opposite each other, but are automatically in mesh, and no jamming or wedging action thus occurs. Hence sticking, cross threading and galling are eliminated, both on initial stabbing and screwing or make-up operations, and also on unscrewing or break-out operations. With respect to the latter, in a lesser degree with respect to the make-up operation, there is a heavy strain on the prior art threads of tool joints in the unscrewing operation which is eliminated by our present invention. In the unscrewing operation the cable attached to the stand or section being unscrewed exerts a strong upward tension tending to tear the threads apart as the upper section is detached. In our joint, this strain is carried by more than 50% of the lengths of the flank surfaces 25, 25' of the threads and the several turns of the threads comprising these lengths are disengaged simultaneously at approximately the stabbing position, thereby eliminating the tendency to tear the threads apart as the upper section is detached.

Although our tubing tool joint has ample sealing qualities from the thread fit, it is preferred to make the seal-off feature of the joint independent of the torque applied. To do this, the shoulder 5 of the pin member 1 is provided with an annular, substantially semi-circular groove 26 and an O-ring packing element 27 is positioned therein. The end 13 of the box member 3 is also provided with an annular, semi-circular groove 28 which receives the packing ring 27 when the joint is made up as illustrated in Fig. 1.

Production tubing of the type above referred to with which our joint is particularly adapted for use, is designed for use only in producing the fluid or gas from a well after it has been completed and for this reason a conventional V-type or round form fine (8 or 10 threads per inch) threaded coupling is used for joining together the lengths of pipe and/or tubing. However, due to the expense and time involved, it has become a common practice in all oil fields not to use drill pipe but rather employ the production tubing which is already in place, for such operations as testing, perforating, drilling cement plugs, deepening, cutting and pulling screen and liner and other related workover operations. These uses of production tubing necessitate from one to sometimes as many as twenty to thirty trips in and out of the well bore with the production tubing string.

These numerous trips in and out of the well with production tubing naturally cause wear on the tubing threads and collars to such an extent that when workover operations are finished and it is desired to produce or flow the well through this same production tubing, it is found that due to the wear and tear to which the tubing has been subjected, many leaks develop and it then becomes necessary to replace many worn joints with new joints and in any number of cases it has been found necessary to replace the entire tubing string with a new string of tubing and the old string is then junked and has no further value.

One of the chief advantages of our tubing tool joints is that by their use in conjunction with the production tubing, the wear of the repeated trips in and out of the well (screwing and unscrewing of sections) is absorbed by them so that when workover operations are completed, and our tubing tool joints are removed, the threads of the production tubing are in the same condition as when the tubing was first run into the well.

In addition to thread wear caused by frequent screwing and unscrewing operations with conventional production tubing, there is the ever increasing damage both to the tubing and the collar caused by the tongs or wrenches used to make and break the non-shouldering, fine threaded slow tapered conventional threaded tubing. Not only are wrenches used but often it is necessary to hammer the joints with sledge hammers in order to vibrate the fine threaded, non-shouldering slow tapered conventional tubing joint loose. These hammers always mark up the tubing and collars and many times mash it in such a manner that it is rendered unsafe for further use.

Thus, another outstanding advantage to be gained by the use of our tubing tool joint is for it to absorb all this punishment, thus saving the production tubing and its threads for their prime purpose of transporting the production of the well.

We claim:

1. A tubing tool joint for use in a production string of tubing and the like, said tool joint comprising pin and box members provided with bores, the upper end of the bore of said pin member being enlarged and threaded and adapted to receive the threaded lower end of an upper section of said tubing, said pin member having a lower, external tapering surface, said box member having an upper, internal tapering surface, mating trapeziform screw threads on said tapering surfaces of said pin and box members, the crests of said threads being flattened for an appreciable extent and extending substantially parallel with the axis of said joint to provide mating engagement of the threads without interference from the crests thereof, said joint having a maximum outer diameter substantially equal to the outer diameter of the usual coupling collar used in connection with said tubing and a minimum inner diameter substantially equal to the inner diameter of said tubing, and said box member having a lower threaded end of reduced diameter adapted to be received in said coupling collar.

2. A tubing tool joint for use in a production string of tubing and the like, said tool joint comprising pin and box members provided with bores, the upper end of the bore of said pin member being enlarged and threaded and adapted to receive the threaded lower end of an upper section of said tubing, said pin member having a lower, external tapering surface, said box member having an upper, internal tapering surface, mating trapeziform screw threads on said tapering surfaces of said pin and box members, each of said screw threads consisting of from 6 to 10 turns and the crests of said threads being flattened for an appreciable extent and extending substantially parallel with the axis of said joint to provide mating engagement of the threads without interference from the crests thereof, said joint having a maximum outer diameter substantially equal to the outer diameter of the usual coupling collar used in connection with said tubing and a minimum inner diameter substantially equal to the inner diameter of said tubing, and said box member having a lower threaded end adapted to be received in said coupling collar.

3. A tubing tool joint for use in a production string of tubing and the like, said tool joint comprising pin and box members provided with bores, the upper end of the bore of said pin member being enlarged and threaded and adapted to receive the threaded lower end of an upper section of said tubing, said pin member having a lower, external tapering surface, said box member having an upper, internal tapering surface, mating trapeziform screw threads on said tapering surfaces of said pin and box members, each of said screw threads consisting of from 6 to 10 turns and the crests of said threads being flattened for an appreciable extent and extending substantially parallel with the axis of said joint to provide mating engagement of the threads without interference from the crests thereof, and said box member having a lower threaded end.

ROBBINS M. CLAYPOOL.
DAVID M. BEST.

REFERENCES CITED

The following references are of record in the file of this patent:

UNITED STATES PATENTS

| Number | Name | Date |
| --- | --- | --- |
| 1,932,427 | Stone | Oct. 31, 1933 |
| 2,094,491 | Janata | Sept. 28, 1937 |
| 2,107,716 | Singleton | Feb. 8, 1938 |

FOREIGN PATENTS

| Number | Country | Date |
| --- | --- | --- |
| 524,123 | Great Britain | July 30, 1940 |